Aug. 24, 1965   J. MARTIN   3,202,384
VEHICLE EJECTION SEATS
Filed Feb. 13, 1964   2 Sheets-Sheet 2

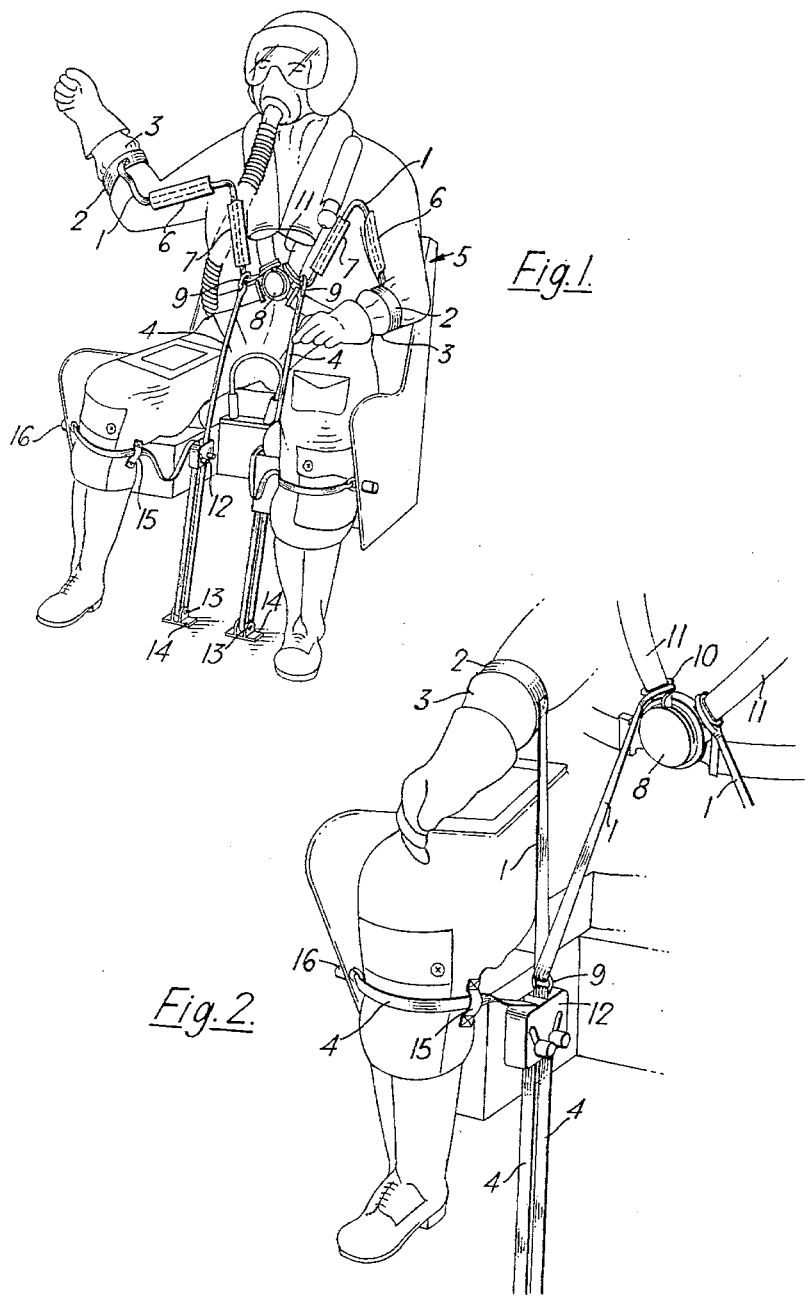

Inventor
James Martin
By

3,202,384
VEHICLE EJECTION SEATS
James Martin, Southlands Manor, Southlands Road,
Denham, near Uxbridge, England
Filed Feb. 13, 1964, Ser. No. 344,609
Claims priority, application Great Britain, Feb. 18, 1963,
6,486/63
8 Claims. (Cl. 244—122)

This invention concerns vehicle ejection seats and has for its object the provision, for such a seat, of means for restraining at least the arms of an occupant of such seat from movement during ejection of the seat from the vehicle.

Although this invention is particularly concerned with airman and aircraft ejection seats and will be described in relation thereto, the terms "aircraft ejection seat" and "airman" should be understood herein to embrace any vehicle ejection seat and its occupant where the context so admits.

According to this invention, there is provided a restraining system for restraining at least the arms of an airman seated in an ejection seat from movement during ejection, said restraining system comprising at least one line adapted to be attached to the arms of an airman in such a manner that on ejection of the seat the line will be tensioned to restrain the arms of the airman against movement.

The restraining system comprises a pair of lines, each such line having one of its ends secured to tensioning means and passing from tensioning means through an arm loop at the respective forearm of the airman, each such line being secured at its other end to a quick-release box positioned in the proximity of the abdomen of the airman.

The tensioning means comprise a pair of tensioning lines individually secured to the respective restraining lines, said tensioning lines being adapted to pass through a snubbing box secured to the ejection seat and being releasably secured to the aircraft from which ejection takes place. Each tensioning line may also serve to restrain one of the legs of the airman against movement.

According to another feature of this invention, each said tensioning line may pass from its connection to the aircraft through a second snubbing box and around the respective leg of the airman.

Preferably, said tensioning line may pass from said second snubbing box, through a loop on the overall worn by the airman, said loop being positioned on the overall below the knee of the airman, to a releasable connection on the ejection seat. Alternatively each said restraining line may serve to restrain one of the legs of the airman.

According to yet another feature of this invention each restraining line may pass through at least one guide, this guide being positioned between the points of attachment of each restraining line to the forearm of the airman and the quick-release box, each said guide releasing the respective restraining line when the latter is tensioned. Very conveniently each restraining line may pass through two guides.

Desirably each said guide may be formed from two sheets of material secured together and which are adapted to part when subjected to a predetermined load. Alternatively, however, each said guide may be formed from a single sheet of material secured to an overall worn by the airman.

In order that the invention may be more readily understood two embodiments of the same will be described by way of example and with reference to the accompanying drawings, in which:

FIGURE 1 is a perspective view of an airman seated in an ejection seat showing the position of two pairs of lines of a preferred arrangement in accordance with the invention for restraining his arms and legs during ejection;

FIGURE 2 is a fragmentary perspective view of the arrangement of FIGURE 1, showing the condition of one pair of lines after the ejection of the seat from an aircraft has been initiated;

Figures 3, 4:
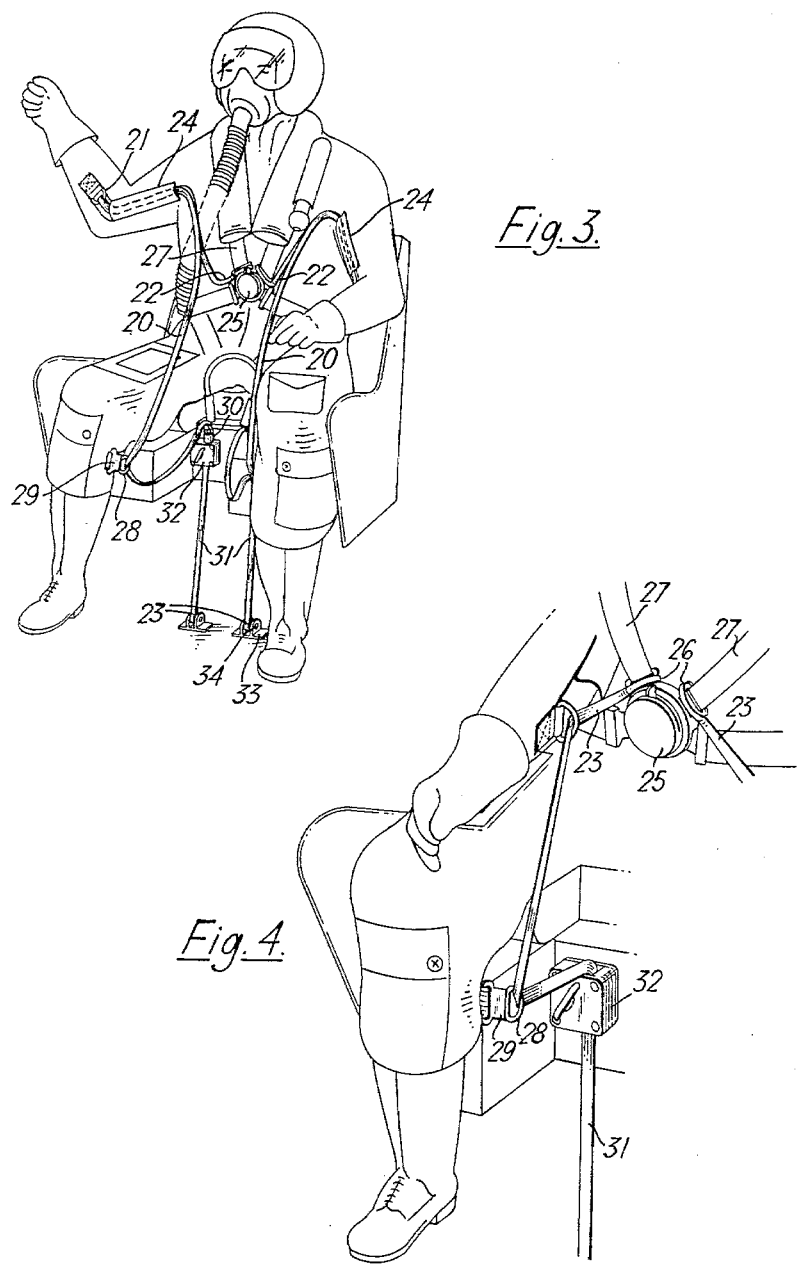
FIGURE 3 is a perspective view, similar to FIGURE 1, showing the second embodiment of this invention.
FIGURE 4 is a fragmentary perspective view, similar to FIGURE 2, of said second embodiment.

In the preferred embodiment of the invention, illustrated in FIGURES 1 and 2, the arms and legs of an airman seated in an ejection seat are adapted to be restrained, during ejection, by two pairs of lines, one pair of lines serving for restraining the left arm and left leg of the airman and the second pair of lines for restraining the right arm and right leg of the airman.

Each said pair of lines comprise a restraining line 1 which in use is connected, by means of a loop 2, to the forearm 3 of the airman, and a tensioning line 4 which is connected to the ejection seat, generally designated 5, which is only partially depicted in the drawings.

In this preferred embodiment of each restraining line 1 normally, i.e. prior to initiation of ejection and as shown in FIGURE 1, passes from the connection with its loop 2 upwardly towards the respective shoulder of the airman through a guide 6 (to be described more fully hereinafter) on the airman's flying overall and then downwardly, through a further guide 7 on the overall, towards a quick-release box 8 of the airman's seat harness, this box 8 being situated adjacent the abdomen of the airman.

Adjacent to the quick-release box 8, each line 1 extends through an individual D-ring 9 connected to the tensioning line 4 paired with the line 1. The lines 1 each terminate in a loop 10 adapted to be threaded by a lug on the end of an individual shoulder harness strap 11, the lugs being received by the box 8 to secure the lines 1 and straps 11 for simultaneous release upon operation of the quick-release box in the latter part of the seat ejection sequence.

The tensioning lines 4 extend from D-rings 9 downwardly between the legs of the airman through individual first snubbing boxes housed in containers 12, then under and around shear pins 13 secured to the floor of the aircraft by brackets 14, and then upwardly through second snubbing boxes within the containers 12. From its second snubbing box, each line 4 extends through a loop 15 sewn on to the airman's flying overall at a position slightly below the knee of the adjacent leg and thereafter passes substantially horizontally across the front of such leg below the knee to an attachment 16 on the ejection seat. The attachments 16 serve releasably to secure the lines 4 to the seat.

Each of the guides 6 and 7 comprises a pair of tapes sewn together along their edges and to the airman's flying overall, or a single tape sewn along its edges to the airman's flying overall, in such a manner as to constitute a tube for enclosing the associated line 1, the stitching being arranged to permit the tapes to part, or the single tape to separate from the overall, as the case may be, to free the restraining line therein, under suitable line load. In a modified arrangement, each guide 6, 7 is formed from a pair of strips of self-adhering pile fabric, the edges of the strips being pressed together to form a guide which will open, by separating the strips, when the line 1 in such guide is subject to suitable tension. The guides thus serve to retain the lines 1 on the flying overall in positions where they will not hamper normal movement of the arms of the airman.

On ejection of the seat 5 from the aircraft, the seat moves upwardly and away from the floor of the aircraft and each tensioning line 4 is drawn through its respective first and second snubbing boxes, whereby the airman's legs are drawn rearwardly to be retained adjacent the ejection seat, and the D-rings 9 are drawn downwards, as shown in FIGURE 2.

The movement of each D-ring 9 to the position shown in FIGURE 2 causes a loop in each line 1 to be drawn downwardly, thereby freeing the line from the guides 6 and 7 so that each line 1 extends substantially in a straight line from its D-ring 9 to its respective loop 2. The length of each line 1 is such that, when its D-ring 9 is in the position shown in FIGURE 2, the arms of the airman are held with the elbows adjacent to the knees.

The continued upward movement of the seat 5 causes the pins 13 to shear under the tension in lines 4 when the lines 1 and 4 have reached the condition shown in FIGURE 2. The snubbing boxes retain the lines 1 and 4 in such condition. At a later stage in the ejection sequence, the quick-release box 8 is operated to free the airman from his seat harness and from the lines 1, the lines 4 being simultaneously released at the attachments 16, whereby the airman is freed from the seat to make a parachute descent.

In the second embodiment illustrated in FIGURES 3 and 4, the restraining system comprises a pair of restraining lines 20, each such line 20 being threaded through an individual connecting loop, for example a metal D-ring 21, secured to an airman's flying overall adjacent to an elbow of the airman wearing the overall. The free ends 22, 23 of the lines 20 pass upwardly towards the respective shoulders of the airman through guides 24, the end 22 of each line 20 then passing to the quick-release box 25 of the airman's seat harness, such end 22 of the line 20 having a loop 26 adapted to be threaded over a lug at the end of the respective shoulder strap 27 of the airman's seat harness which lug, when secured in the quick-release box 25, secures the end 22 of the line 20 for release, with the strap 27, upon operation of the quick-release box. Each guide 24 is formed from a pair of tapes in the same manner as the guides 6 and 7 of the arrangement shown in FIGURES 1 and 2.

The remaining and longer part of each restraining line 20 passes downwardly from the shoulder end of the guide 24 between the legs of the airman and through an individual leg loop 28 constituting part of a releasable coupling, the remaining part 29 of the coupling being sewn on to the airman's overall below the knee. Each restraining line 20, which is freely threaded through its associated leg loop 28, is releasably secured by means of a quick-release connector device 30 (to be more fully described hereinafter) to a tensioning line 31 which extends through a snubbing box 32 secured to the front of the ejection seat and then downwardly to an attachment on the aircraft in which the seat is situated. Each said attachment comprises a bracket 33 and a shear pin 34. If desired, strong attachments may be employed in conjunction with a weak link in each tensioning line.

The quick-release connector device 30 comprises a tubular housing secured to its tensioning line 31 and adapted to receive a mating plug to which the respective restraining line 20 is attached. Said plug comprises a tubular body adapted to plug into said housing, the housing having an annular flange which is engaged by a pair of detents spring-biased outwardly by a plunger.

The said tubular body of the plug contains a central portion to which said detents are pivoted and which may be moved axially of the body, against the action of a compression spring, to cause the detents to be withdrawn from the flange on the housing by cam action on the housing so that the central portion and tubular body may be withdrawn from the housing.

Prior to the airman entering the seat each restraining line 20 is threaded through its associated arm loop 21 and guide 24 and the excess remaining line is stowed in a pocket (not shown) provided on the flying overall adjacent the shoulder. When the airman enters the aircraft and sits in the ejection seat the portions of each restraining line stowed in said pockets are withdrawn and the looped end 22 of each line 20 is connected to the seat harness quick-release box 25 by threading the lugs on the ends of the shoulder straps 27 of the seat harness through the looped ends of the respective restraining lines 20 prior to engaging the lugs in the quick-release box 25. The other, longer, length of each restraining line 20 is then threaded through the respective leg loop 28 and then connected to its tensioning line 31 by means of the quick-release connector device 30. As in the case of the arrangements of FIGURES 1 and 2, the restraining lines are sufficiently slack to allow free movement of the airman's arms and legs.

However, on ejection of the seat from the aircraft, the tensioning lines 31, which are secured to the aircraft, are tensioned when the ejection seat moves upwardly away from the aircraft. The tensioning lines 31 are thus drawn through the snubbing boxes 32 and thereby cause the restraining lines 20 to be pulled through the snubbing boxes 32 to become tensioned and to tear open the guides 24, the lines 20 so freed from the guides 24 then extending directly from their terminations at the quick-release box 25 to the arm loops 21 near the airman's elbows and not running via the shoulders of the airman. Further tensioning of the restraining lines will thus cause the elbows of the airman to be drawn towards the quick-release box 25 and adjacent his body. The tensioning of the restraining lines also draws the leg loops 28 rearwardly towards the snubbing boxes 32 and thereby causes the legs of the airman to be withdrawn rearwardly to a position adjacent to the front of the ejection seat. At a predetermined tension, the shear pins 34 securing the tensioning lines to the brackets 33 on the aircraft shear and the snubbing boxes 32 will retain this tension in the restraining lines 20.

With the arrangements described above the airman's arms and legs are secured safely adjacent the seat so that their injury by contact with parts of the aircraft is precluded. However, since arm restraint is applied adjacent to the elbows, limited movement of the hands is permitted for movement of controls, such as harness release devices on the seat so that the airman may over ride the automatic functions of the seat should this be necessary.

I claim:
1. An aircraft ejection seat having a restraining system comprising, in combination:
   (a) two restraining lines;
   (b) first securing means for securing one end portion of each line to a restraining harness adjacent the abdomen of an airman occupying said seat;
   (c) second securing means for securing another portion of each restraining line to a respective arm of said airman; and
   (d) tensioning means for tensioning each line in response to ejection of the seat, thereby to restrain the arms of the airman against movement.
2. A seat as set forth in claim 1, wherein said other portion of said line is the other end portion thereof.
3. A seat as set forth in claim 1, wherein said first securing means include a quick-release box, a plurality of seat harness strap means for securing said box to said abdomen, and means releasably fastening said one end portion to said box.
4. A seat as set forth in claim 3, wherein said second securing means include a ring member, means for attaching said ring member to said arm, said other portion of said line passing through said ring member.
5. In an ejection arrangement for an airman, in combination:
   (a) an ejection seat;
   (b) harness means for releasably securing an airman to said seat, said harness means includin:
      (1) a quick-release box, and
      (2) a plurality of harness strap means normally secured to said box and to said seat for holding the box against the abdomen of an airman wearing the harness, and releasable from said box;
(c) two snubbing boxes on said seat;
(d) two restraining lines, each line having two terminal portions and a plurality of intermediate portions interposed between said terminal portions;
(e) means securing one of said terminal portions of each line to said quick release box for release thereby when said harness strap means is released from said quick-release box;
(f) two connecting members;
(g) means for securing said connecting members respectively to the arms of said airman, a first intermediate portion of each line nearer said one terminal portion slidingly engaging the associated connecting member, and a second intermediate portion of each line farther from said one terminal portion passing through an associated snubbing box; and
(h) means engaging the other terminal portion of each line for pulling the same through said associated snubbing box in response to ejection of said seat.

6. In an arrangement as set forth in claim 5, two ring members, means for securing each ring member to a respective leg of said airman, a third intermediate portion of each line interposed between said first and second intermediate portions passing through a respective ring member.

7. In an arrangement as set forth in claim 5, guide means for releasably securing another one of said intermediate portions of each interposed restraining line between said one terminal portion and said second intermediate portion to the body of said airman.

8. In an ejection arrangement for an airman, in combination:
(a) an ejection seat;
(b) harness means for releasably securing an airman to said seat, said harness means including
  (1) a quick release box and
  (2) a plurality of harness strap means normally secured to said box and to said seat for holding the box against abdomen of an airman wearing the harness, and releasable from said box;
(c) two snubbing boxes on said seat;
(d) two restraining lines, each line having two terminal portions;
(e) means securing one of said terminal portions of each line to one of said harness strap means for release thereby when said one harness strap means is released from said quick release box;
(f) arm loop means on the other terminal portion of each restraining line for attaching said other terminal portion to a corresponding arm of said airman;
(g) a tensioning line passing through each snubbing box and having two end portions;
(h) connecting means on one of said end portions of each tensioning line slidably engaging a portion of a respective restraining line intermediate said terminal portions of the latter, and
(i) means engaging the other one of said end portions for pulling said tensioning line through the associated snubbing box in response to ejection of said seat, said connecting means being dimensioned to prevent passage thereof through said snubbing box.

References Cited by the Examiner

UNITED STATES PATENTS

| | | | |
|---|---|---|---|
| 2,528,532 | 11/50 | Martin | 244—122 |
| 2,836,382 | 5/58 | Martin | 244—122 |
| 2,929,587 | 3/60 | Martin | 244—122 |
| 2,940,701 | 6/60 | Beem et al. | 244—122 |

FOREIGN PATENTS 1,234,027  5/60  France.

MILTON BUCHLER, *Primary Examiner.*
FERGUS S. MIDDLETON, *Examiner.*